United States Patent [19]
Natho

[11] 3,893,652
[45] July 8, 1975

[54] MEANS CONNECTING GATE VALVE AND VALVE STEM

[75] Inventor: Paul J. Natho, Houston, Tex.

[73] Assignee: ACF Industries, Incorporated, New York, N.Y.

[22] Filed: July 15, 1974

[21] Appl. No.: 488,647

Related U.S. Application Data

[63] Continuation-in-part of Ser. No. 404,066, Oct. 5, 1973, abandoned.

[52] U.S. Cl. ............ 251/84; 251/196; 403/319
[51] Int. Cl.² .................................. F16K 25/00
[58] Field of Search ....... 251/84, 14, 167, 195, 196, 251/197, 199, 203, 202; 403/316, 317, 319

[56] References Cited
UNITED STATES PATENTS

| | | | |
|---|---|---|---|
| 989,257 | 4/1911 | Herudon | 403/319 X |
| 1,776,280 | 9/1930 | Boyd | 403/319 |
| 2,855,175 | 10/1950 | Dunbar | 251/196 |
| 2,991,042 | 7/1961 | Natho | 251/14 |
| 3,463,446 | 8/1969 | Natho | 251/84 |
| 3,696,831 | 10/1972 | Fowler | 251/84 |
| 3,823,911 | 7/1974 | Natho | 251/196 |

*Primary Examiner*—Harold W. Weakley
*Attorney, Agent, or Firm*—Eugene N. Riddle

[57] ABSTRACT

A gate nut connects the gate element to a valve stem and spring mounted plungers on the gate element position and retain the gate nut in position on the gate element. When employed with a gate assembly of the expanding type having a gate element and segment, the nut contacts the segment of the gate assembly to limit the expansion of the gate assembly to prevent binding the gate element and segment against the seats.

8 Claims, 8 Drawing Figures

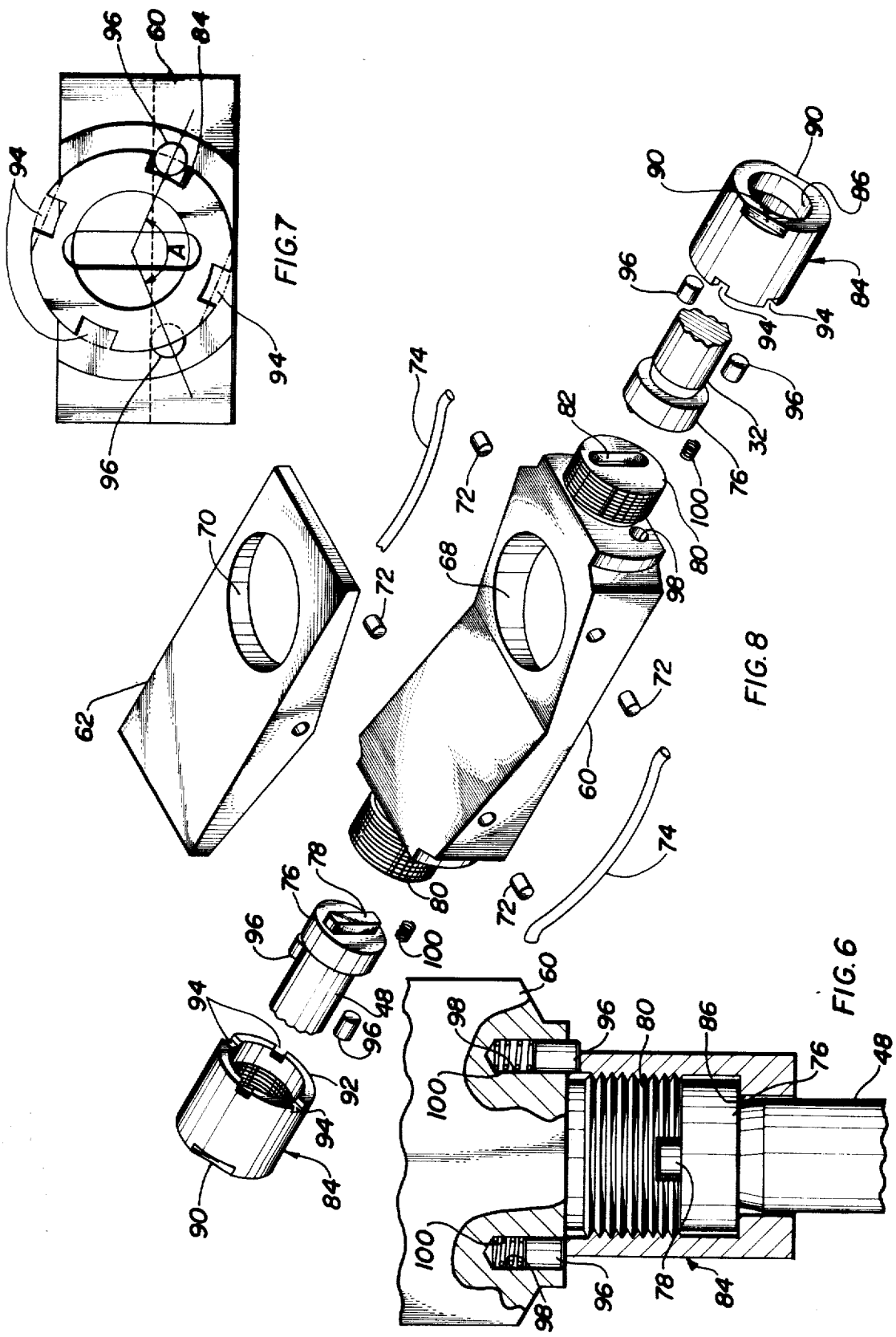

3,893,652

MEANS CONNECTING GATE VALVE AND VALVE STEM

CROSS-REFERENCE TO RELATED APPLICATION

This application is a continuation-in-part of application Ser. No. 404,066 filed Oct. 5, 1973 and entitled "Means Connecting Gate Valve and Valve Stem" and now abandoned.

BACKGROUND OF THE INVENTION

The field of art to which the invention pertains is to a gate valve having a reciprocating valve assembly moving transversely of the flow passage. The gate valve assembly has an operating stem connected to a gate element and seats are positioned on opposed sides of the gate element.

In the construction of gate valves as provided heretofore, a valve stem has been connected to the gate segment by a gate nut threaded onto the valve segment. The gate nut sometimes tends to become loose and unthread when in use resulting from vibration and other forces. When the gate nut unthreads galling of the threads commonly occurs which may make difficult the disassembly of the stem and gate. A substantial amount of unthreading could result in the drive connection between the stem and gate being disconnected. Set screws have been employed heretofore such as illustrated in U.S. Pat. No. 3,463,446 to retain the gate nut but such set screws have been found to be unsatisfactory in some instances as oftentimes such set screws tend to loosen.

In expanding gate valves of the type having a segment which moves or expands outwardly from the gate, the gate assembly especially when moving from a closed position to an open position will expand during movement and thereby tend to bind against the seats.

DESCRIPTION OF THE PRESENT INVENTION

This invention relates to a gate valve structure having an operating stem connected to the gate element by a gate nut. The nut receives an enlarged shoulder on the stem and is threaded onto an externally threaded extension on the gate element for connecting the operating stem to the gate element. The nut has a plurality of recesses spaced along its annular end surface adjacent the gate element and the recesses are adapted to receive selectively spring mounted outwardly biased plungers on the gate element which position the nut on the gate element and restrain the nut against rotation.

When a balanced stem gate valve assembly is employed, an operating stem and a pilot or balancing stem are mounted on opposed ends of the gate element adjacent opposed threaded extensions on the gate element. A gate nut connects the balancing stem and gate element in the same manner as the operating stem. When the balanced stem gate valve assembly is of the expanding type employing a gate element and segment with adjacent wedge surfaces to expand the gate mechanism at open and closed positions, the gate nut limits the expansion of the gate element and segment of the valve assembly. The expansion is limited by the balancing stem nut contacting the segment to limit movement of the segment from the gate and thus, binding of the gate element and segment against the seats is minimized. Especially when an expanding gate valve assembly is moving from a closed position to an open position it is desirable to limit the expansion of the gate assembly to minimize any binding of the gate assembly against the seats during such movement as fluid pressure from the flowline is acting against the gate assembly in closed position.

BRIEF DESCRIPTION OF THE DRAWINGS

In the accompanying drawings in which one of the various possible embodiments of the invention is illustrated.

FIG. 6 is a sectional view, partly in elevation, showing means to position and restrain the nut connecting the stem to the gate assembly against rotation;

FIG. 7 is a plan view, partly diagrammatic, indicating the arrangement of the nut on the gate element with the stem removed; and FIG. 8 is an exploded view of the expanding gate assembly.

Figure 1:
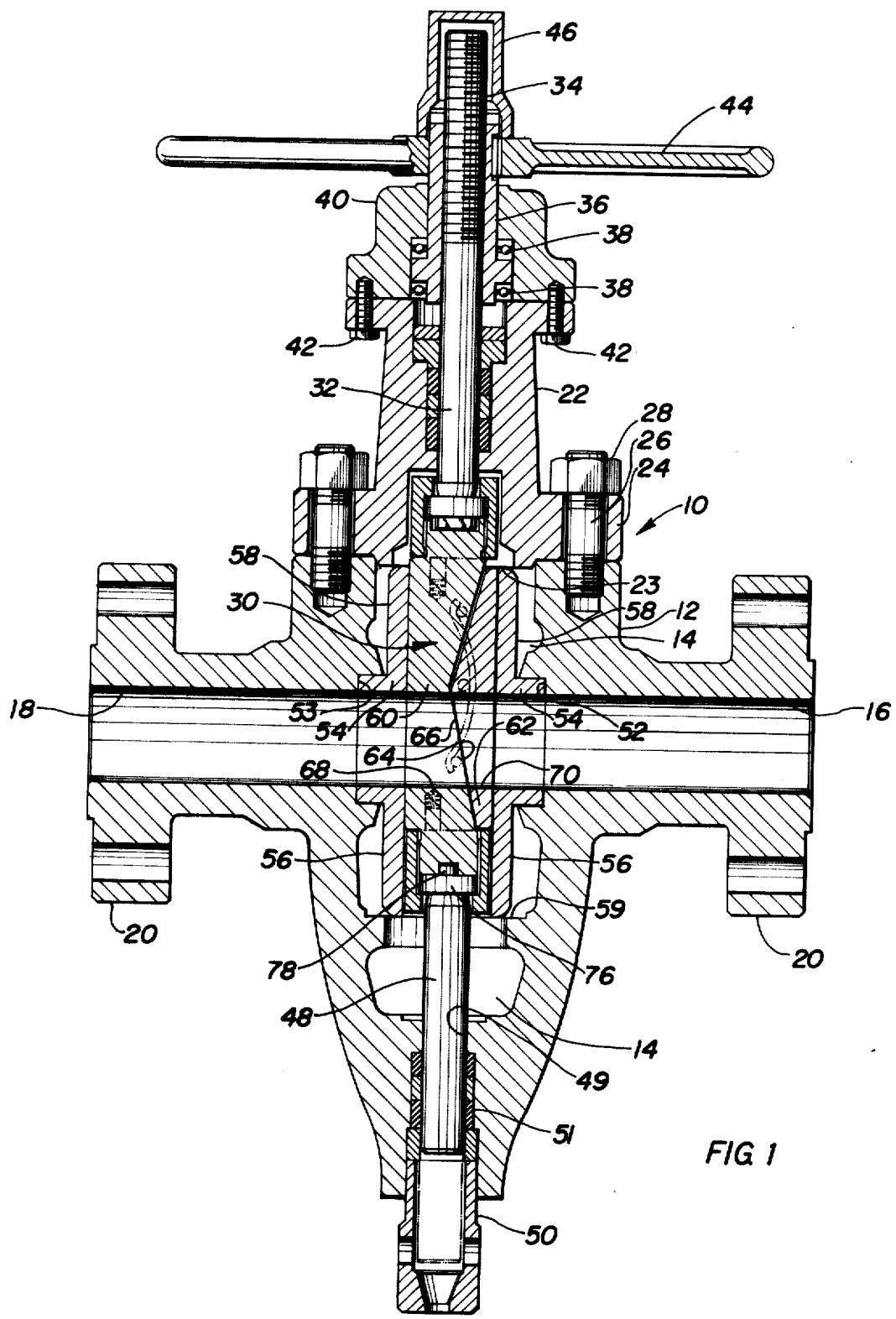
FIG. 1 is a cross section of a hydraulically balanced gate valve having an expanding gate assembly and embodying the present invention.

Referring now to the drawings for a better understanding of the invention, and more particularly to FIG. 1, a gate valve structure generally indicated 10 includes a valve body generally designated 12 having a valve chamber 14 therein. An inlet flow passage 16 and an outlet flow passage 18 communicate with valve chamber 14. Flanges 20 on the ends of the valve body 12 may be suitably connected to a pipeline or other flow system as is well known in the art. A bonnet 22 has a lower circumferential surface 23 and a flange 24 which is secured by studs 26 and nuts 28 to the upper end of body 12.

A gate valve assembly generally indicated 30 is mounted within chamber 14 for movement between open and closed positions relative to flow passages 16 and 18. An upper operating valve stem 32 has an upper threaded portion 34. An internally threaded drive sleeve 36 is supported for rotary movement relative to bonnet 22 by thrust bearings 38 mounted within a bearing housing 40. Bearing housing 40 is secured by studs 42 to the upper end of bonnet 22. A handwheel 44 is disposed at the upper end of drive sleeve 36 and is retained thereon by stem cover 46. It is understood that any one of a number of possible manual or power operator mechanisms may be provided to control the movement of operating stem 32.

Mounted adjacent the lower end of gate assembly 30 is a pilot or balancing stem 48. Balancing stem 48 is received by an opening 49 in body 12 which communicates with chamber 14 and a lower sleeve 50 is telescoped within opening 49. Packing 51 is disposed around stem 48 adjacent the end of sleeve 50. Sleeve 50 may be suitably threaded within the opening or bore 49 formed in body 12. Stems 32 and 48 are of substantially the same area so that there remains in chamber 14 at all times the same proportional amount of stem which results in a generally hydraulically balanced valve assembly. Fluid pressure in chamber 14 above and below the gate assembly is therefore equalized and the gate assembly is balanced.

Formed in body 12 adjacent valve chamber 14 are annular recesses 52 and 53 which extend about respective flow passages 16 and 18. Identical seat elements 54 are pressed within annular recesses 52 and 53. Each seat element 54 includes a lower skirt portion 56, and upper skirt portion 58, and a smooth inner face which is in sliding contact with the adjacent gate assembly 30. Upper skirt portion 58 is positioned closely adjacent circumferential surface 23 and lower skirt portion 56 is positioned closely adjacent an annular shoulder 59 formed in chamber 14.

Gate assembly 30 includes a gate element 60 and a complementary segment 62. Gate element 60 has a concave V-shaped backface 64 and segment 62 has a complementary convex V-shaped backface 66 adapted to fit V-shaped face 64 and upon relative longitudinal movement between gate element 60 and segment 62 to expand gate assembly 30 outwardly. Suitable ports 68 and 70 are provided in gate element 60 and segment 62 to align with flow passages 16 and 18 in an open position of gate assembly 30. Lugs 72 extend from opposed sides of gate element 60 and segment 62 and a spring 74 on each opposed side engages the associated lugs 72 for continuously urging gate element 60 and segment 62 toward a collapsed or retracted position.

Operating stem 32 and pilot stem 48 are connected to gate assembly 30 in identical manner. Each stem 32 and 48 has an enlarged annular shoulder 76 thereon and an elongate key 78 extending inwardly from shoulder 76. Each externally threaded extension 80 on gate element 60 has an elongate slot 82 thereon which receives adjacent elongate key 78 in a driving connection.

A connecting nut generally indicated 84 is threaded onto each extension 80 for connecting stems 32 and 48 to gate assembly 30. Connecting nut 84 is described in detail for connecting pilot stem 48 and it is understood that connecting nut 84 for operating stem 32 is identical. Nut 84 is internally threaded and has an opening 86 receiving pilot stem 48. An internal annular abutment 88 engages annular shoulder 76 to secure pilot stem 48 within nut 84. Flats 90 on opposed sides of nut 84 permit suitable rotation of nut 84 by a suitable hand tool, such as a wrench or the like. The lower circumferential end surface 92 of nut 84 has four recesses 94 spaced 90° apart with respect to each other along annular surface 92. FIGS. 6 and 7 clearly show the pair of plungers 96 and nut 84 in their mounted relation. A portion of each plunger 96 extends laterally outwardly beyond the outer peripheral surface of the end portion of nut 84. A portion of the end of each plunger 96 extends beyond annular surface 92 and is exposed adjacent the outer peripheral surface of nut 84. To position nut 84 onto threaded extension 80, a pair of plungers 96 is mounted within openings 98 provided in gate element 60 adjacent threaded extension 80. Springs 100 urge plungers 96 outwardly. Referring to FIG. 7, plungers 96 are arranged at an angle A of 135° with respect to the axis of rotation. To position cap 84, plungers 96 are depressed either by a screwdriver or some suitable hand tool and then cap 84 is threaded onto extension 80 until contact is made with circumferential end surface 92 against gate element 60. Nut 84 may then be backed off until a plunger 96 engages a recessed portion 94. As plungers 96 are arranged at an angle A of 135° with respect to each other and four recesses 94 are provided, a plunger 96 will engage a recess 94 upon each 45° of rotation of nut 84. Operating stem 32 is secured to upper extension 80 in a manner similar to pilot stem 48.

The present invention permits the lower nut 84 to engage the lower edge of segment 62 in the open position of gate assembly 30 to limit the expansion between gate element 60 and segment 62 thereby to minimize any binding of gate assembly 30 against seats 54. For example, with respect to a gate valve around 4 inches in diameter, in the collapsed position of gate assembly 30, a spacing of between around .015 inch and .030 inch is provided between gate assembly 30 and seats 54. If uncontrolled expansion between gate element 60 and segment 62 is permitted by an excessive amount of torque being applied by handwheel 44, gate assembly 30 in its open position might tightly bind against seats 54 which might require an excessive amount of torque being applied in order to break the gate loose for movement to a closed position. The expansion between gate element 60 and segment 62 may be predetermined by selected positioning of nut 84 onto extension 80 which would control the position at which nut 84 contacts segment 62 in the open position.

Figure 4:
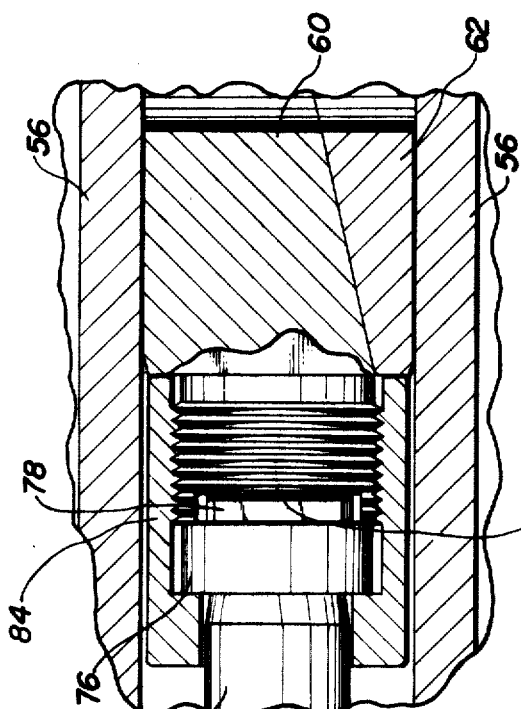
FIG. 4 is an enlarged fragment of FIG. 2 in full open position with the lower stem nut contacting the segment of the gate assembly.
Figure 5:
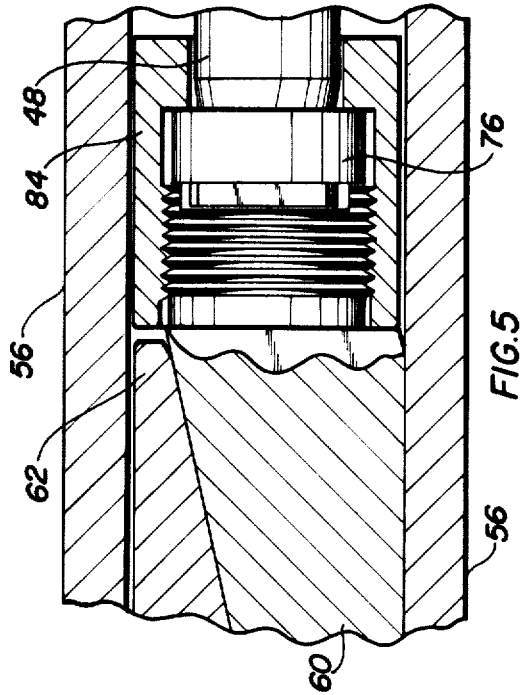
FIG. 5 is an enlarged view similar to FIG. 4 but showing the lower stem nut spaced from the adjacent segment of the gate assembly prior to the expanding of the assembly to a full expanded position.
Figure 3:
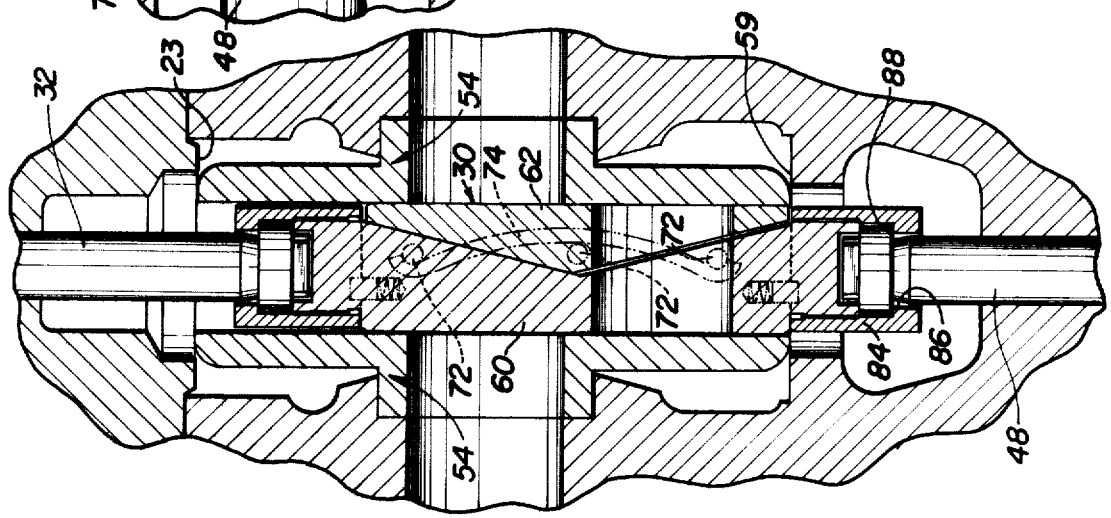
FIG. 3 is a sectional view similar to FIG. 2 but showing the gate assembly in a closed position.
Figure 2:
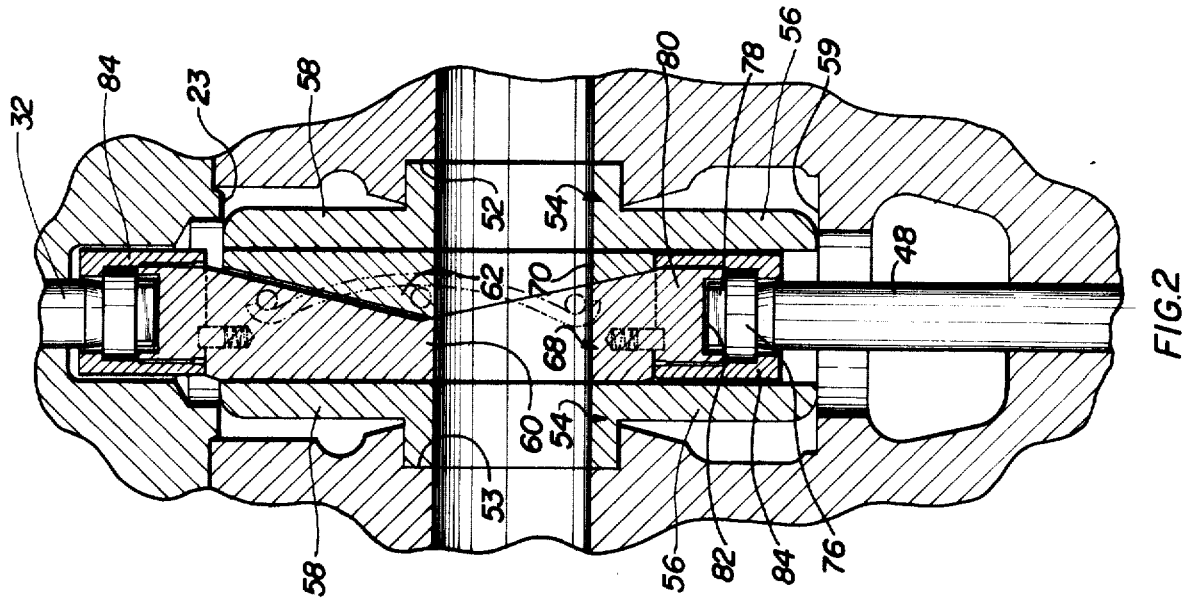
FIG. 2 is an enlarged fragment of FIG. 1 showing the gate assembly forming the present invention in fully open position.

In operation and referring to FIG. 3 in which gate assembly 30 is shown in full closed position with segment 62 engaging shoulder 59 in chamber 14 which acts as a stop, rotation of handwheel 44 results in the upward movement of gate element 60 to remove the spacing between the lower adjacent wedge shaped faces of element 60 and segment 62 and provides a spacing between the upper adjacent wedge shaped faces of element 60 and segment 62 in the collapsed position of gate assembly 30 before expansion thereof. In this position, gate assembly 30 moves to its upper position until the upper edge portion of segment 62 contacts a stop formed by lower circumferential surface 23 of bonnet 22. Upon initial contact of segment 62 with surface 23 lower nut 84 is spaced from the lower edge of segment 62 as shown in FIG. 5. Continuous rotation of handwheel 44 results in the upward movement of gate element 60 while segment 62 is restrained. Such a movement expands gate assembly to the position shown in FIG. 4 until lower nut 84 contacts the lower surface of segment 62. In this position, further expansion of gate assembly 30 is restrained and the amount of expansion is sufficient to seal gate assembly 30 against seats 54 for preventing any leakage between gate assembly 30 and seats 54. The expansion of gate assembly 30 may be, for example, around .020 inch when a spacing of between .015 inch and .030 inch is provided between gate assembly 30 and seats 54 in the collapsed position dependent on the manufacturing tolerances. The amount of expansion may be determined by the positioning of nut 84 on threaded extension 80. Gate assembly 30 may be easily moved from its full open position without the provision of any excessive torque on handwheel 44. Upon rotation of handwheel 44 from the full open position shown in FIGS. 1 and 4, gate element 60 moves downwardly relative to segment 62 for collapsing gate assembly 30. Then, the gate assembly 30 moves downwardly until segment 62 bottoms out against surfaces 59 of valve chamber 14.

Under some operating conditions especially when springs 74 are not adequate to prevent segment 62 from moving away from gate 60 during movement from a closed position toward an open position, lower nut 84 will contact segment 62 during the initial movement of gate 60 from the full closed position. Thereafter, during travel of the gate assembly to the open position, lower nut 84 will remain in contact with segment 62 and no further expansion of the gate assembly will occur. The expansion of the gate assembly is thus limited by lower nut 84 and binding during travel of the gate assembly from closed position to open position is minimized. The amount of clearance provided between seat elements 54 and gate assembly 30 during movement from closed position to open position may be determined by the position of nut 84 and nut 84 may be adjusted for the desired amount of clearance. If desired, upper nut 84 could be employed in a manner similar to lower nut 84 for limiting expansion upon movement to closed position or after the closed position has been reached.

While nut 84 has been illustrated for use in combination with a gate valve having expanding gate elements it is to be understood that nut 84 may be employed with a slab type gate, if desired.

From the foregoing, it is understood that a gate assembly of an expanding type and a balanced stem may be provided in which the expansion is easily controlled thereby to eliminate binding of the gate elements against the seats as has occurred heretofore when excessive torque is applied to the handwheel. The expansion may be predetermined at open position by the suitable positioning of a lower nut which connects a pilot stem to the gate assembly.

In some instances it may be desirable to have the lower nut 84 secured against rotation at the first position reached when the lower nut 84 is backed off after being fully screwed against gate element 60. This eliminates any judgement that might be required by an assembly of the gate valve structure by a workman in prepositioning lower nut 84 at the desired position in order to obtain the desired expansion between gate element 60 and segment 62. If the lower ends of gate element 60 and segment 62 are held to very close manufacturing dimensions within a .002 inch tolerance lower nut 84 may be easily positioned to provide the desired expansion of gate assembly 30 in full open position by fully screwing lower nut 84 against gate element 60 and then backing off nut 84 until a plunger 96 engages a recess 94.

What is claimed is:

1. A gate valve structure comprising a valve body having a valve chamber therein and inlet and outlet flow passages communicating with the valve chamber, a gate member slideably mounted within the valve chamber for movement between open and closed positions of the gate valve structure, a threaded extension on an end of the gate member, a stem at the end of said gate member adjacent said threaded extension and having an enlarged annular shoulder adjacent said gate member, a nut having a central opening receiving said stem and an annular abutment adjacent said central opening engaging said annular shoulder in abutting relation to retain the stem, said nut being threaded onto said extension and thereby connecting said stem and gate member, said gate member adjacent said threaded extension having at least one outwardly biased plunger thereon, said plunger having a portion thereof extending laterally outwardly beyond the outer peripheral surface of the end of said nut, and a plurality of recessed portions spaced along the circumferential end surface of said nut adapted to selectively receive the plunger therein to restrain the nut against rotation and position the nut relative to said threaded extension.

2. A gate valve structure as set forth in claim 1 wherein the gate valve member has two oppositely positioned outwardly biased plungers thereon closely adjacent said extension.

3. A gate valve structure comprising a valve body having a valve chamber therein and inlet and outlet flow passages communicating with the valve chamber, an expanding valve assembly including a gate element and segment slidably mounted within the valve chamber for movement between open and closed positions of the gate valve structure with said gate element and segment expanding away from each other at the fully open position, seats about said flow passages for engaging said gate element and segment in the open and closed positions of the gate element and segment, an extension on an end of the gate element, a stem adjacent the extension, and a nut on the extension connecting the stem to the gate element, said segment being closely spaced from the adjacent end surface of the nut for said stem when the gate assembly is in a closed position, said nut upon expansion of the gate assembly after the gate assembly is moved from a closed position thereof abutting the segment to restrain further expansion between the gate element and segment thereby to minimize binding of the gate element and segment against the seats.

4. A gate valve as set forth in claim 3 wherein means on said gate element closely adjacent the extension for said nut selectively restrains the nut against rotation relative to the extension and permits selective adjustment of said nut on the associated extension.

5. A gate valve structure as set forth in claim 4 wherein said means on said gate element comprises at least one outwardly biased plunger adjacent the threaded extension, and recessed portions on the nut engage the plunger when the nut is threaded onto the extension.

6. A gate valve structure comprising a valve body having a valve chamber therein and inlet and outlet flow passages communicating with the valve chamber, an expanding valve assembly including a gate element and segment slidably mounted within the valve chamber chamber for movement between open and closed positions of the gate valve structure with said gate element and segment expanding away from each other at the fully open position, seats about said flow passages for engaging said gate element and segment in the open and closed positions of the gate element and segment, an extension on opposite ends of the gate element, an operating stem adjacent one extension for opening and closing the expanding valve assembly and a pilot stem adjacent the other extension with said stems having substantially the same area of displacement in the valve chamber, means connecting the operating stem to one of the extensions, and a nut on the other extension connecting the pilot stem to the gate element, said segment being closely spaced from the adjacent end surface of the nut for said pilot stem when the gate assembly is in a closed positions, said pilot stem nut upon expansion of the gate assembly after the gate assembly is moved from a closed position thereof abutting the segment to restrain further expansion between the gate element and segment thereby to minimize binding of the gate element and segment against the seats.

7. A gate valve as set forth in claim 6 wherein means on said gate element closely adjacent the extension for said pilot stem nut selectively restrains the nut against rotation relative to the extension and permits selective adjustment of said nut on the associated extension.

8. A gate valve as set forth in claim 7 wherein said means on said gate element comprises at least one outwardly biased plunger adjacent the threaded extension, and recessed portions on the nut engage the plunger when the nut is threaded onto the extension.

* * * * *